United States Patent

Ross

[11] 4,291,591
[45] Sep. 29, 1981

[54] DOUBLE-SHUTTLE MOTION TRANSMITTING APPARATUS

[75] Inventor: Louis Ross, Des Plaines, Ill.

[73] Assignee: Borg-Warner Corporation, Chicago, Ill.

[21] Appl. No.: 22,680

[22] Filed: Mar. 21, 1979

[51] Int. Cl.³ .................... F16H 35/04; F16H 21/14
[52] U.S. Cl. ........................................ 74/650; 74/66; 74/68; 74/69
[58] Field of Search .................. 74/650, 68, 66, 69

[56] References Cited

U.S. PATENT DOCUMENTS

| | | | |
|---|---|---|---|
| 848,931 | 4/1907 | Sundberg et al. | 74/68 |
| 1,098,422 | 6/1914 | Bayly | 74/650 |
| 1,278,231 | 9/1918 | Seeck | 74/650 |
| 1,364,745 | 1/1921 | Gerber | 74/650 |
| 1,463,356 | 7/1923 | Ziegler | 74/650 |
| 1,499,480 | 7/1924 | Seeck | 74/650 |
| 1,663,882 | 3/1928 | Gould | 74/650 |
| 1,843,163 | 2/1932 | Jex | 74/650 |
| 1,854,910 | 4/1932 | Remington | 74/650 |
| 1,954,347 | 4/1934 | Coulombe | 74/650 |
| 2,016,849 | 10/1935 | Arnold | 74/650 |

FOREIGN PATENT DOCUMENTS 819628  1/1952  Fed. Rep. of Germany .......... 74/68

Primary Examiner—Leslie Braun
Assistant Examiner—Lawrence J. Gotts
Attorney, Agent, or Firm—Julian Schachner

[57] ABSTRACT

Motion transmitting apparatus includes a case member, a pair of coaxial shaft members, and a pair of shuttle members. The members rotate about the shaft axis in unison as a differential mechanism, with differential action between the shaft members provided by oscillation and reciprocation of the shuttle members in opposite directions relative to another axis perpendicular to the shaft axis. Grounding the case member causes this opposite oscillation and reciprocation of the shuttle members to provide a reversal of the direction of rotation of the shaft members.

10 Claims, 6 Drawing Figures

DOUBLE-SHUTTLE MOTION TRANSMITTING APPARATUS

BACKGROUND OF THE INVENTION

This invention relates generally to the transmission of motion. More particularly it relates to a double-shuttle motion transmitting apparatus which may be used as a differential mechanism or as a reversing mechanism.

In recent years there have been many improvements in mechanisms which provide differential or reversing action. This is especially true in the automotive industry, where it is desirable to provide simple, light, quiet and yet efficient mechanisms. Some work to that end has been directed toward so-called gearless differentials. One problem with such differentials is that they are inherently unbalanced, and thus give rise to severe loading problems.

Sundberg et al U.S. Pat. No. 848,931 discloses a reversing device for shafts. This requires a complicated system of levers which results in an inherently unbalanced device. Bayly U.S. Pat. No. 1,098,422, Gerber U.S. Pat. No. 1,364,745 and Gould U.S. Pat. No. 1,663,882 disclose differential mechanisms incorporating what may be termed single shuttles. Each of these mechanisms is inherently unbalanced due to the necessary motion of the single shuttle during differential action.

There remains a need in the art for a simple, balanced reversing or differential mechanism which will be economical to manufacture, and which will operate quietly and efficiently.

SUMMARY OF THE INVENTION

One of the goals of this invention is to meet the need noted above. To that end there is provided a balanced double-shuttle motion transmitting apparatus which may be used either as a differential mechanism or as a reversing mechanism.

The apparatus includes a case which forms a partial journal for a first shuttle, which in turn forms a partial journal for a second shuttle. First and second shafts have eccentrically oriented discs at their inner ends within the case. The discs are in engagement with both shuttles, and the arrangement is such that the apparatus is balanced both statically and, due to oscillation and reciprocation of the shuttles in opposite directions, dynamically.

The apparatus is formed from simple components which may be fabricated and assembled economically. It is light and may be operated quietly and economically.

BRIEF DESCRIPTION OF THE DRAWINGS

The objects and advantages of this invention will become apparent to those skilled in the art upon careful consideration of the specification herein, including the drawings, wherein.

Figure 1:
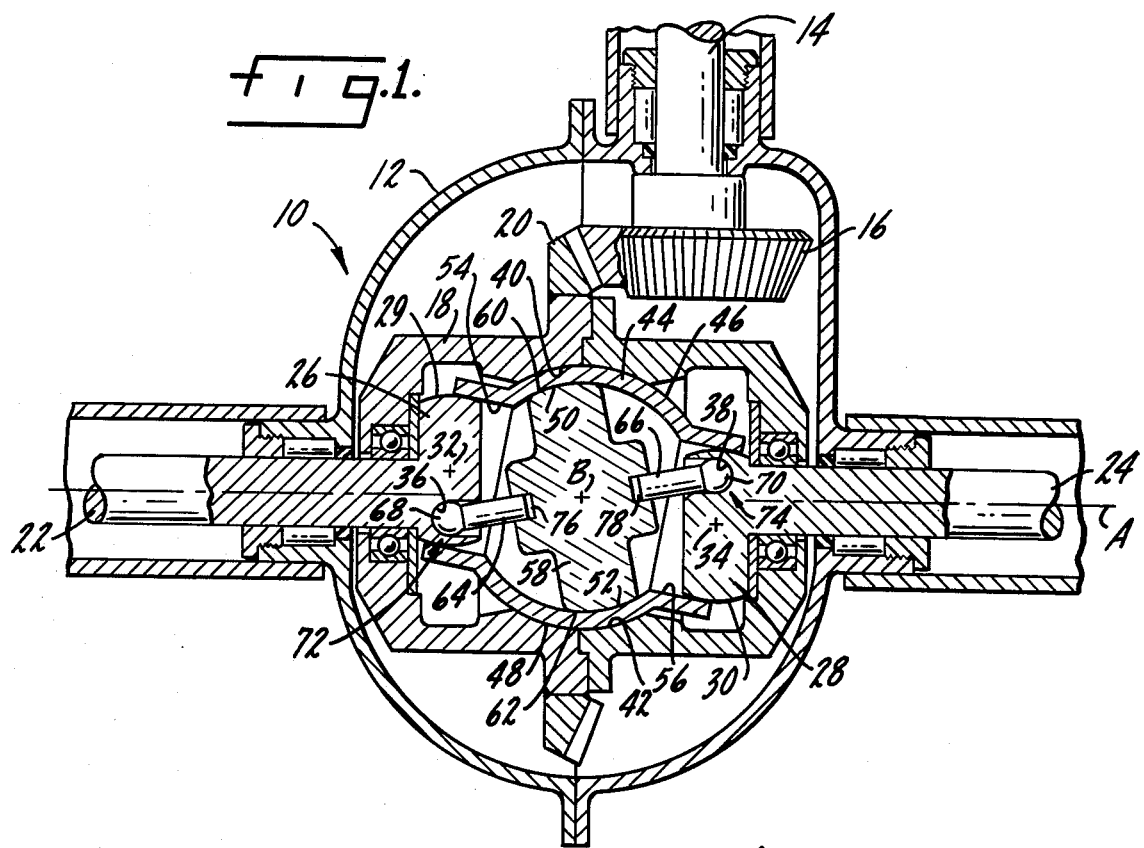
FIG. 1 is a sectional view of the apparatus in the form of a differential mechanism showing the overall relationship of the components.

While this invention is susceptible of embodiment in many different forms, there is shown in the drawings and herein will be described in detail a preferred embodiment. It should be understood that the present disclosure is considered to be an exemplification of the principles of the invention, and is not intended to limit the invention to this embodiment.

DESCRIPTION OF THE PREFERRED EMBODIMENT

Referring now to the drawings in greater detail, there is shown motion transmitting apparatus in the form of a differential mechanism 10. This differential mechanism 10 includes a housing 12 in which is rotatably supported an input element in the form of an input shaft 14. Secured to the inner end of shaft 14 is a suitable bevel gear 16. Within housing 12 is a case member 18 which includes a bevel gear 20 in mesh with gear 16.

First and second output members in the form of first and second output shafts 22 and 24 are rotatably supported by case 18 in housing 12. Shafts 22, 24 are coaxial on a first, longitudinal axis A. Shafts 22, 24 form at their inner ends, respectively, a pair of annular discs 26 and 28 or the like. The edge surfaces 29 and 30 of discs 26, 28 preferably take the form of segments of spheres having centers at points 32 and 34. These points 32, 34 are eccentric to axis A by equal and opposite distances. Discs 26, 28 define sockets 36 and 38 with centers preferably eccentric to axis A respectively, by equal and opposite distances relative to points 32, 34. Case 18 defines a journal in the form of inner surfaces 40 and 42, preferably of partial cylindrical configuration about a second, transverse axis B perpendicular to axis A.

A first, outer shuttle member 44 includes a central portion defining outer surfaces 46 and 48 contiguous to surfaces 40, 42 of case 18. Surfaces 46, 48 preferably have a partial cylindrical configuration about axis B. Shuttle 44 defines inner surfaces 50 and 52, also preferably of partial cylindrical configuration about axis B. Shuttle 44 also includes end portions defining opposed bores 54 and 56. These bores are contiguous to surfaces 29, 30 of discs 26, 28 which are slidably received therein.

A second, inner shuttle member 58 defines outer surfaces 60 and 62 respectively contiguous to surfaces 50, 52 of shuttle 44. Surfaces 60, 62 also preferably are of partial cylindrical configuration about axis B. Shuttle 58 includes pins 64 and 66 slidably received in bores 76 and 78. They respectively define balls 68 and 70 received in sockets 36, 38. Balls 68, 70 and sockets 36, 38 respectively form articulated, ball and socket joints 72 and 74. The centers of mass of balls 68, 70 preferably are eccentric to axis A by equal and opposite distances relative to points 32, 34.

Figure 2:
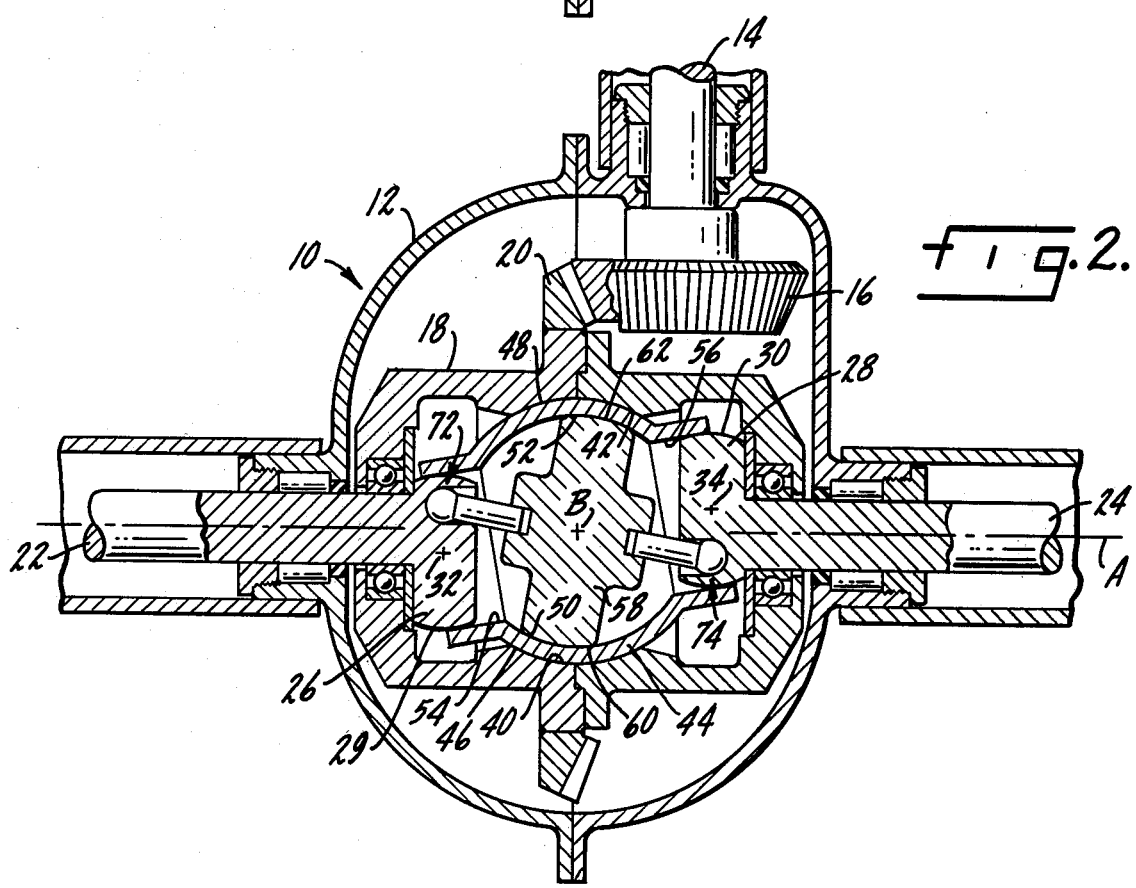
FIG. 2 is a sectional view, similar to FIG. 1, showing rotation of the differential mechanism through 180° with no differential action.

With the apparatus functioning as a differential mechanism, assume no differential action; that is, no relative rotation between shafts 22, 24 which serve as output shafts. Shuttles 44, 58 rotate with case 18 about axis A as it is driven by input shaft 14, but neither oscillate about nor reciprocate along axis B. Torque is transmitted from case 18 to shuttles 44, 58. They in turn drive discs 26, 28 and output shafts 22, 24. With no differential action, members 18, 44, 58, 22 and 24 rotate in unison with no relative movement therebetween. This is shown in FIG. 2, wherein the members have rotated 180° about axis A from the positon shown in FIG. 1. Shafts 22, 24 are rotating in the same direction and at the same speed.

Figure 3:
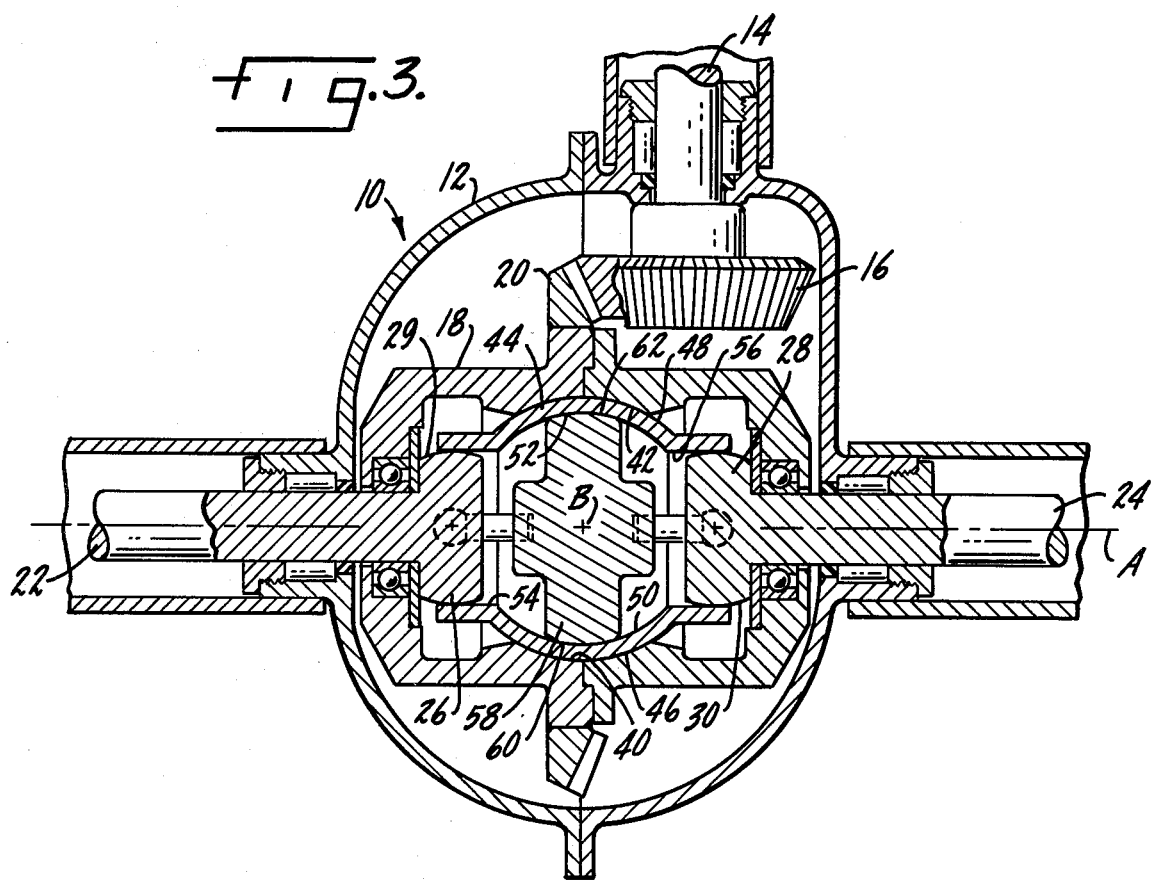
FIG. 3 is a sectional view, similar to FIG. 1, showing rotation of the differential mechanism through 180° with differential action.
Figure 5:
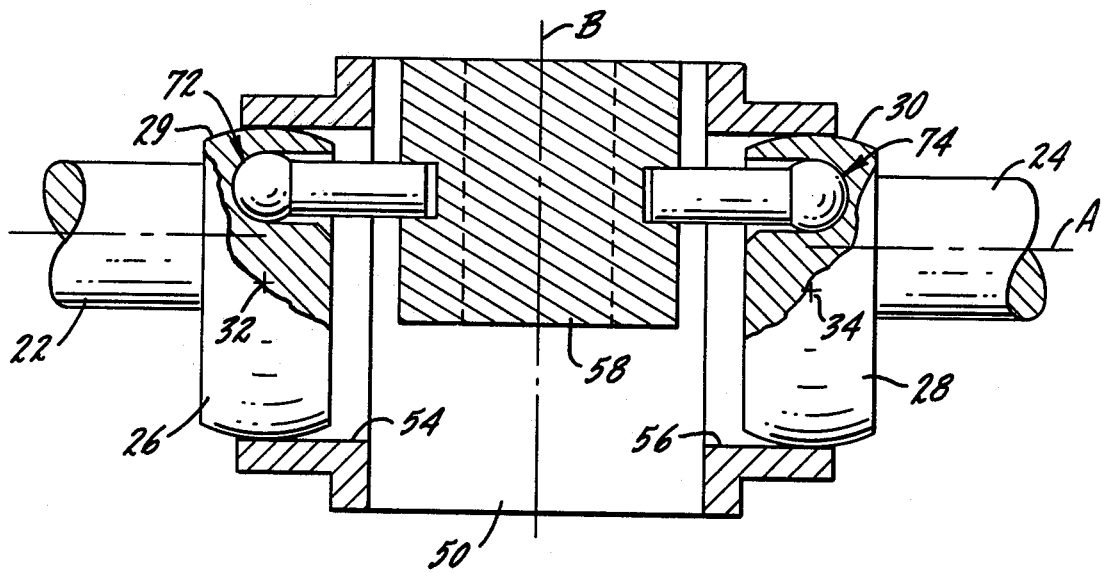
FIG. 5 is an enlarged partial sectional plan view taken along axis A of FIG. 3.
Figure 6:
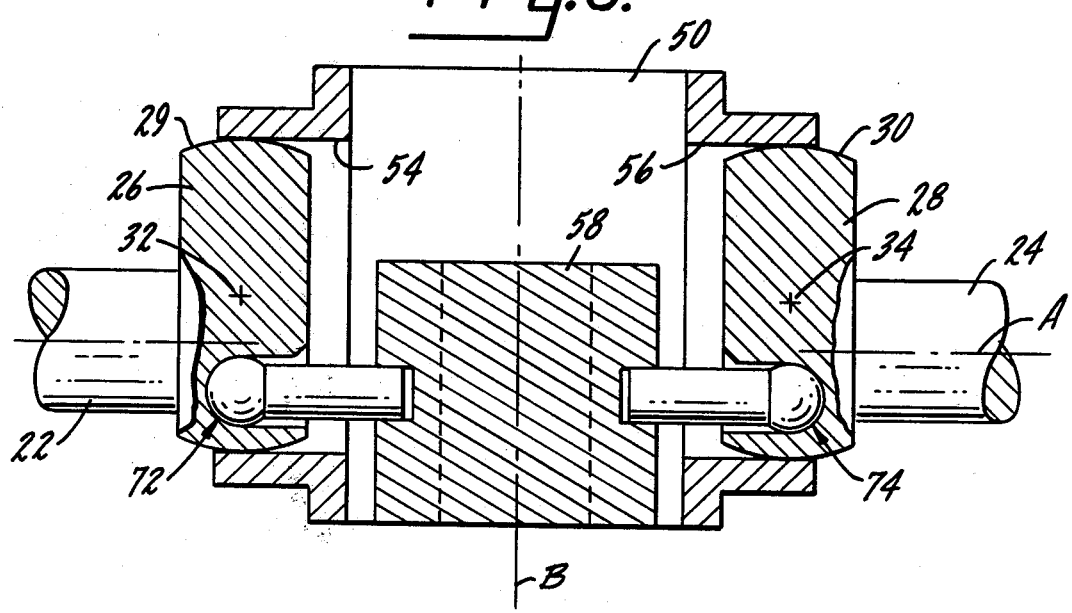
FIG. 6 is an enlarged partial sectional plan view, similar to FIG. 5, showing the apparatus in another position.

Assuming differential action, there will be relative rotation between shafts 22 and 24. Although they actually are rotating in the same direction, in relative terms they are rotating in opposite directions. Discs 26, 28 slide within bores 54, 56. A cranking effect takes place, and discs 26, 28 drive shuttles 44, 58 in opposite directions. This is shown in FIG. 3, wherein shuttle 44 has pivoted clockwise about axis B from the position shown in FIG. 2. Similarly, shuttle 58 has pivoted counter-clockwise about axis B. Continued operation of the mechanism will cause equal and opposite oscillatory movement of shuttles 44, 58 about axis B. In addition, discs 26, 28 drive shuttles 44, 58 such that they reciprocate in opposite directions along axis B, as shown in FIGS. 5 and 6. Thus, in FIG. 3 shuttle 44 has moved out of the plane of the paper along axis B, and shuttle 58 has moved into the plane of the paper along axis B. This action takes place as shuttles 44, 58 rotate with case 18 and shafts 22, 24. It should be noted that there are two torque transfer paths; one from shuttle 44 directly to discs 26, 28 and the other from shuttle 44 through shuttle 58 to discs 26, 28.

It is preferred that shuttles 44, 58 be constructed and arranged such that their polar moments of inertia are equal. Thus, equal and opposite oscillation about axis B and equal and opposite reciprocation along axis B will result in balanced dynamic loading. It is also preferred that they be constructed and arranged such that their static loading is balanced.

In a preferred embodiment of the invention, the centers of balls 68, 70 are eccentric to axis A by amounts equal and opposite to the eccentricity of centers 32, 34 of discs 26, 28. It is contemplated that discs 26, 28 and balls 68, 70 will be constructed and arranged such that their combined centers of mass will be on axis A even though the actual physical centers of discs 26, 28 are offset therefrom. It is also contemplated that the net center of mass of shuttles 44, 58 and discs 26, 28 will be on the intersection of axes A and B.

Thus it will be seen that the apparatus functioning as a double-shuttle differential mechanism is balanced both statically and dynamically, whereas single-shuttle mechanisms of the prior art are neither statically nor dynamically balanced. Further, the double-shuttle mechanism has approximately twice the load capacity of a corresponding single-shuttle mechanism in the same space envelope. The double-shuttle mechanism develops negligble radial loads on the shaft bearings due to the torsional balance obtained by having two equal and opposite drives for each shaft.

Figure 4:
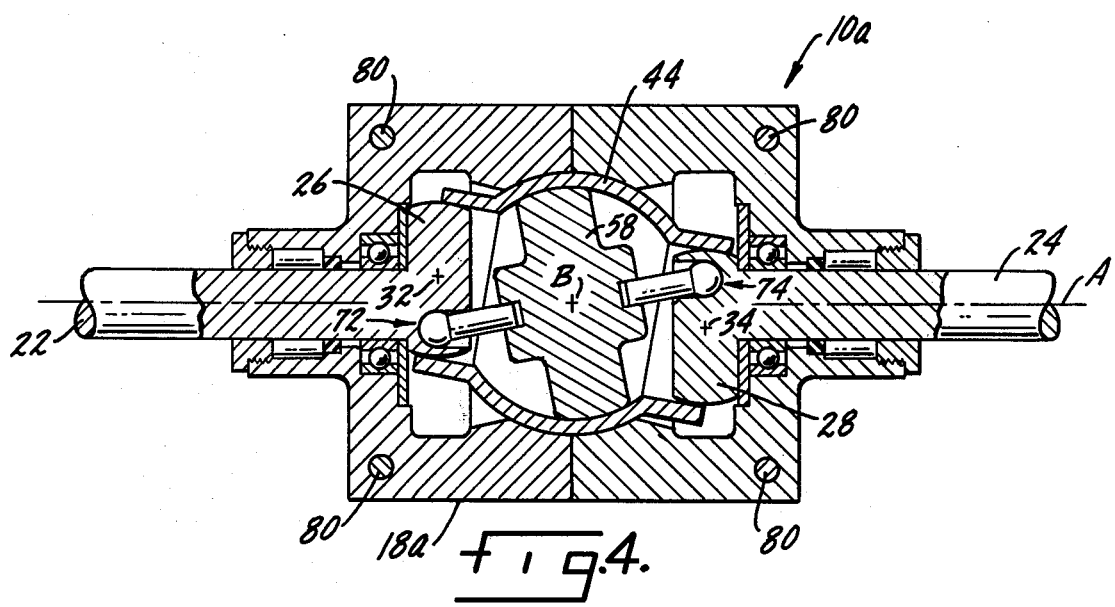
FIG. 4 is a sectional view, similar to FIG. 1, showing the apparatus in the form of a reversing mechanism.

Turning now to FIG. 4, it will be seen that the apparatus may be designed easily to function as a reversing mechanism 10a by eliminating housing 12, element 14, and gears 16, 20. A case member 18a serves as a suitable housing. Case 18a is grounded; that is, it is held stationary by being secured to a suitable frame through bolts 80 or the like. Assuming that shaft 22 is an input and is rotating clockwise, disc 26 drives shuttles 44, 58, causing them to oscillate and reciprocate relative to axis B. Shuttles 44, 58 in turn drive disc 28 such that shaft 24 rotates in the counterclockwise direction. The mechanism is balanced both statically and dynamically as noted above.

The components of the apparatus disclosed herein may be formed simply and economically. The contiguous surfaces of case 18 or 18a, shuttle 44 and shuttle 58 are preferably of partial cylindrical configuration. The contiguous surfaces of discs 26, 28 and shuttle 44 are respectively segments of spheres and bores. Shuttle 44, for example, could be formed from one piece of relatively large tubing with two pieces of relatively small tubing secured at opposite sides thereof.

Friction developed as a result of relative movement of the members of this apparatus is advantageous when it functions as a differential mechanism, as this inherently provides limited slip characteristics. When the apparatus functions as a reversing mechanism, friction may be reduced by the use of suitable materials, coatings, lubricants, etc.

While a preferred embodiment of the invention has been shown and described, this should be considered illustrative and may be modified by those skilled in the art. It is intended that the claims herein cover all such modifications as may fall within the spirit and scope of the invention.

What is claimed is:

1. Motion transmitting apparatus comprising first and second shaft members rotatable on a first axis, a case member having a second axis perpendicular to said first axis, and first and second shuttle members journalled in said case member for opposite oscillation about and reciprocation on said second axis, said first and second shaft members respectively defining first and second discs at their inner ends, said discs being eccentric to said first axis, and said first and second shuttle members engaging said discs for establishing driving relationships therewith.

2. The invention of claim 1, said case member defining a journal for said first shuttle member, and said first shuttle member defining a journal for said second shuttle member, said journals including partial cylindrical surfaces concentric about said second axis.

3. The invention of claim 2, said first shuttle member defining first and second bores, said first and second discs respectively being slidably received in said first and second bores.

4. The invention of claim 3, said second shuttle member being engaged with each of said discs by an articulated joint, each of said joints being eccentric to said first axis, said discs and articulated joints being constructed and arranged such that their combined centers of mass are substantially on said first axis.

5. The invention of claim 3, said first and second discs respectively defining first and second sockets eccentric to said first axis, said second shuttle member defining first and second balls respectively received in said first and second sockets to define therewith first and second articulated joints, the eccentricity of said joints compensating for the eccentricity of said discs such that their combined centers of mass are substantially on said first axis.

6. The invention of claim 1, 2, 3, 4, or 5, said case member being rotatable on said first axis.

7. The invention of claim 1, 2, 3, 4, or 5, said case member being grounded.

8. The invention of claim 1, 2, 3, 4 or 5, said discs being constructed and arranged such that they have substantially equal and opposite eccentricities.

9. The invention of claim 1, 2, 3, 4 or 5, said shuttle members being constructed and arranged such that they have substantially equal and opposite polar moments of inertia.

10. The invention of claim 1, 2, 3, 4 or 5, said shuttle members and discs being constructed and arranged such that their combined center of mass is substantially on the intersection of said first and second axes.

* * * * *